3,340,249
ADENOSINE TRIPHOSPHATE SALTS OF L-ORNITHINE AND PROCESS FOR PREPARING THE SAME
Takao Anraku, Fukuoka-machi, Iruma-gun, Junji Ide, Higashi-Murayama-shi, and Toshio Kobayashi, Tokyo, Japan, assignors to Chugai Seiyaku Kabushiki Kaisha, Tokyo, Japan, a corporation of Japan
No Drawing. Filed Jan. 4, 1965, Ser. No. 423,334
Claims priority, application Japan, Jan. 13, 1964, 39/1,139
5 Claims. (Cl. 260—211.5)

The present invention relates to adenosine triphosphate salts of L-ornithine and also to the processes for preparing the same.

Adenosine triphosphate is a compound having energy-rich phosphate bond which is widely distributed in living body and takes part in several life-phenomena in the living body because it takes part in metabolism of carbohydrate, fat, protein and the like in cooperation with several coenzymes as phosphate donor, and is the source of energy for mechanical work such as muscle movement and the like. Adenosine triphosphate has been used as medicine for treatment of heart diseases such as heart failure, coronary sclerosis and the like, muscle diseases and brain diseases such as cerebral apoplexy, encephalomalacia, etc. Particularly, it is well known in hepatic coma when the ammonia detoxicating function depressed in the liver adenosine triphosphate is utilized as a source of energy for metabolizing ammonia to glutamine so that it is reduced in the brain. Accordingly, the supply of adenosine triphosphate is particularly important for activating ammonia metabolism in the brain. L-ornithine is a medicine which recently attracted notice as a substance for antidoting and excreting free ammonia in the living body through the urea cycle.

Both L-ornithine and adenosine triphosphate take part in the detoxication of ammonia but each have a different mechanism of pharmaceutical action when combined with each other in the form of salt it is observed from animal tests that there is a surprising reduction of ammonia in the blood level as compared with each of the substances alone. From this acknowledgement it may be ascertained that the new compound may display superior effect on the clinical treatment of ammonia surplus diseases, in particular, hepatic coma.

The compounds of the present invention are prepared by reacting adenosine triphosphate with L-ornithine in a water soluble solvent to give a salt of both substances. Adenosine triphosphate is tetrabasic acid so that according to the present invention four kinds of adenosine triphosphate salt of L-ornithine may be obtained by reacting one mole of adenosine triphosphate with one, two, three and four mole of L-ornithine at will. Additionally, the present adenosine triphosphate salt of L-ornithine may be administered to the salt-contraindicational patients because it does not contain any metal. And these compounds may be obtained in the form of finely dried powder suitable for injection when it is dried by freeze-drying. Further, owing to its low hydroscopic and stable property, they are advantageously administered and easy to handle in the preparation of a unit dosage form. The salts of each mol ratio exhibit aforementioned medical effect respectively so that they may be used as is or by adjusting pH and the like. In particular the new compounds contain a large amount of L-ornithine, that is, the compound is combined with three or four molecules of L-ornithine so as to remarkably increase the efficacy of L-ornithine. Further, these salts are neutral or weak basic so that they may be used physiologically for injections. Adenosine triphosphate itself decomposes quickly in the acid side of an aqueous solution but the salts thereof with L-ornithine are stable. According to the present invention, adenosine triphosphate salts of L-ornithine may be obtained by either reacting adenosine triphosphate with L-ornithine in the free state or reacting their salts to yield solvent-insoluble salts, for example, the barium salt of adenosine triphosphate and the sulfate of L-ornithine. Also, the compounds may be obtained by a reaction utilizing an ion-exchange resin. In the reaction L-ornithine is used in 1–4 times mol or small excess of such ratio against adenosine triphosphate. When mole ratio is one, two, three or four times the salts respectively corresponding thereto may be obtained. In other cases, for example, when 2.5 times mole of L-ornithine is used a salt mixture having mole ratio of 1:2 and 1:3 may be obtained. For the solvent, water may be used alone but water containing organic solvent and other substances may also be used if they display substantially the similar effect as water.

The present invention will be explained more in detail as follows. Adenosine triphosphate is dissolved in an aqueous medium and then L-ornithine is added thereto and dissolved. Alternatively an aqueous solution of metallic salt of adenosine triphosphate is passed through a column containing basic type of anion-exchange resin, for example, Amberlite IRA–411 (trademark of the ion-exchange resin produced and sold by Rohm & Haas Co.) to absorb adenosine triphosphate on the resin and L-ornithine is passed thereon. By this procedure, the salt produced in the resin column is flowed out. In another way, the metallic salt of adenosine triphosphate is passed through a column containing an acid type of cation exchange resin, for example, Amberlite IRC–50 and the adenosine triphosphate produced is put into the aqueous solution containing L-ornithine. The reaction solution thus obtained is mixed as is or in a concentrated state with an organic solvent, in which case, the produced salt is not dissolved but is miscible with water, for example, methanol and the mixture is left alone under cooling to deposit crystals which are collected by filtration and dried.

In this way, corresponding to the amount of L-ornithine used from mono to tetra L-ornithine salts of adenosine triphosphate may be obtained. Tri-L-ornithine salt decomposes at 156°–160° C. and a 5% aqueous solution thereof is pH 7.1–7.6. Analysis showed that said salt contained 3 moles of L-ornithine to 1 mole of adenosine triphosphate. Tetra-L-ornithine salt of adenosine triphosphate decomposes at 142°–146° C. and a 5% aqueous solution thereof is pH 9.4–9.8. Analysis showed that said salt contained 4 moles of L-ornithine to 1 mole of adenosine triphosphate.

The present invention will be explained more in detail by way of examples as follows:

*Example 1*

In 50 mol of aqueous solution containing 5.1 g. of adenosine triphosphate, 4.0 g. of L-ornithine corresponding to three times mole amount of adenosine triphosphate is dissolved by stirring. The mixture is concentrated under reduced pressure to 11 ml. and 5 ml. of methanol is added. The mixture is left alone in an ice room overnight. The crystals deposited are collected by filtration, washed with small amount of methanol and dried to yield 8.4 g. of adenosine triphosphate tri-L-ornithine salt is obtained. Decomposition point is 156°–158° C. Analysis showed that nitrogen content was 16.78% (17.04%) and L-ornithine content was 43.54% (43.87%). Note: The numerals in parenthesis is the theoretical value.

*Example 2*

A solution of 5.5 g. of disodium adenosine triphosphate in 100 ml. of water was passed through a resin column containing 50 ml. of anion exchange resin Amberlite IRA–411 (basic type). After the resin column was washed with water and the elute did not show a basic reaction on litmus paper, a solution of 5.3 g. of L-ornithine, corresponding to four times mole amount of adenosine triphosphate, in 100 ml. of water was passed through said resin column to flow out. The column was then washed with 20 ml. of water. The mixture of the elute and washed solution was concentrated up to 12 ml. under reduced pressure and 6 ml. of methanol was added. The mixture is left alone in an ice room over-night. The crystals deposited are collected by filtration, washed with a small amount of methanol and dried to yield 9.5 g. of adenosine triphosphate tetra-L-ornithine salt having a decomposition point of 143°–144° C. Analysis showed that nitrogen content was 17.42% (17.57%) and L-ornithine content was 50.95% (51.03%).

*Example 3*

A solution of 5.5 g. of disodium adenosine triphosphate in 100 ml. of water was passed through a resin column containing 40 ml. of cation exchange resin Amberlite IRC–50 (acid type). The solution flowed out was at once collected in a solution of 5.3 g. of L-ornithine in 20 ml. of water. The resin column was further washed with 20 ml. of water. This washed solution was added to said collected solution and the mixture was concentrated up to 12 ml. under reduced pressure. The concentrate was diluted with 6 ml. of methanol and left alone in an ice room overnight. The crystals deposited are collected by filtration, washed with a small amount of methanol and dried to yield 9.9 g. of adenosine triphosphate tetra-L-ornithine salt having a decomposition point of 144°–146° C.

*Example 4*

In place of 5.3 g. of L-ornithin, 4.0 g. of L-ornithin was used as in Example 2 to give 8.2 g. of adenosine triphosphate tri-L-ornithine salt having a decomposition point of 159°–160° C.

*Example 5*

In place of 5.3 g. of L-ornithine, 4.0 g. of L-ornithine was used as in Example 3 to give 8.5 g. of adenosine triphosphate tri-L-ornithine salt having a decomposition point of 157°–159° C.

We claim:
1. Adenosine triphosphate mono-L-ornithine salt.
2. Adenosine triphosphate di-L-ornithine salt.
3. Adenosine triphosphate tri-L-ornithine salt.
4. Adenosine triphosphate tetra-L-ornithine salt.
5. The L-ornithine salts of adenosine triphosphate.

References Cited

UNITED STATES PATENTS

| | | | |
|---|---|---|---|
| 3,089,869 | 5/1963 | Mauvernay | 260—211.5 |
| 3,152,116 | 10/1964 | Broida | 260—211.5 |

LEWIS GOTTS, *Primary Examiner.*

J. R. BROWN, *Assistant Examiner.*